United States Patent [19]

Schlecht

[11] Patent Number: 5,190,779
[45] Date of Patent: Mar. 2, 1993

[54] COUNTERCURRENT EXTRACTION OF COFFEE

[75] Inventor: Klaus Schlecht, Orbe, Switzerland

[73] Assignee: Nestec S.A., Vevey, Switzerland

[21] Appl. No.: 721,154

[22] Filed: Jun. 26, 1991

[30] Foreign Application Priority Data

Jul. 18, 1990 [EP] European Pat. Off. ........ 90113716.6

[51] Int. Cl.⁵ ............................................... A23F 5/26
[52] U.S. Cl. .................................... 426/434; 426/432
[58] Field of Search ................................. 426/434, 432

[56] References Cited

U.S. PATENT DOCUMENTS 3,720,518 3/1973 Galdo et al. .
4,129,665 12/1978 Clark .

FOREIGN PATENT DOCUMENTS 0224338 6/1987 European Pat. Off. .
1440433 6/1976 United Kingdom .

*Primary Examiner*—Joseph Golian
*Attorney, Agent, or Firm*—Vogt & O'Donnell

[57] ABSTRACT

To reduce insoluble solids contained in a coffee extract obtained from a countercurrent extraction process, the percolation rate of extraction liquid passing through at least one extraction cell, which is positioned intermediately in the countercurrent cell series between extraction cells containing the least extracted coffee material and the most extracted coffee material, is reduced. The flow of extraction liquid may be increased through an extraction cell in the series downstream from the at least one cell in which the percolation rate is reduced.

8 Claims, 1 Drawing Sheet

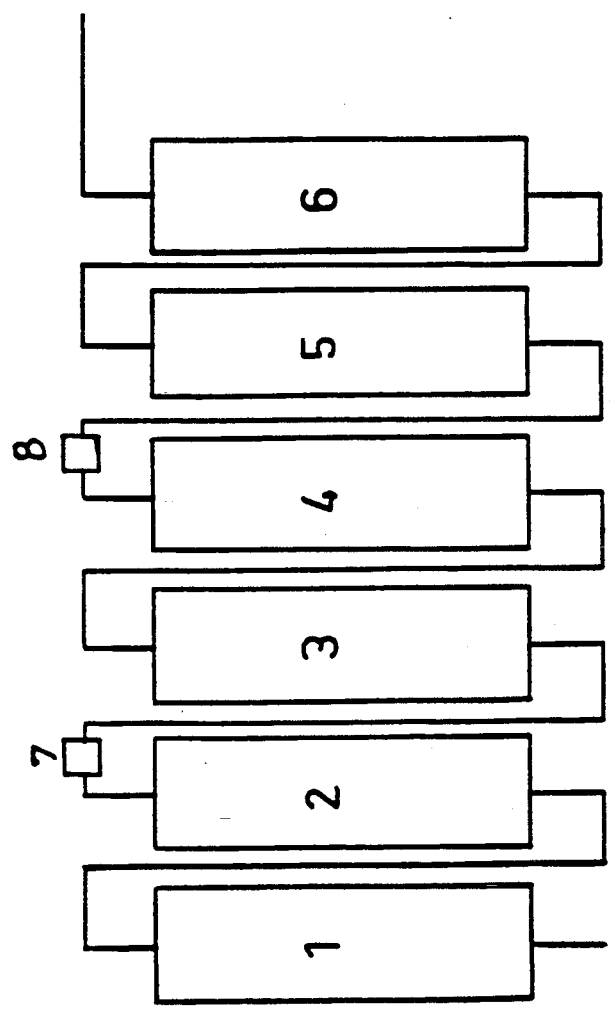
Figure unique

COUNTERCURRENT EXTRACTION OF COFFEE

BACKGROUND OF THE INVENTION

This invention relates to a process and an apparatus for the production of soluble instant coffee in powder form.

Soluble coffee powder is conventionally produced by freeze-drying or spray-drying after evaporation of a coffee extract obtained by the percolation of an extraction liquid through cells filled with ground roasted coffee (Sivetz, Coffee Processing Technology, Volume 1, pages 262, 263, AVI, 1963).

Extraction is carried out in countercurrent fashion, i.e., water under pressure at a temperature of 150° to 180° C. is introduced into the cell containing the batch of ground roasted coffee which has been most intensively extracted (having undergone N extractions) at the bottom of that cell, and then liquid extract of this extraction cell is passed through the extraction cell containing the batch of coffee which has been extracted (N−1) times, and so on, until the liquid extract passes through the cell which has just been filled with fresh ground roasted coffee, and the final extract leaves the last cell at a temperature on the order of 100° C.

In such countercurrent extraction, the most intensively extracted coffee is thus subjected to the highest temperature while the fresh coffee is subjected to the lowest temperature.

A distinction is normally drawn between the hot cells, which contain the most intensively extracted coffee, and the cold cells, which contain the least intensively extracted coffee.

After each extraction cycle, the cell containing the most intensively extracted coffee is emptied, filled with fresh coffee and, after the cells have been suitably interconnected, another extraction cycle begins.

Although the final extract obtained at the exit of the extraction cell containing the freshest coffee contains only a small quantity of ground coffee particles, fines always being entrained, it is necessary to filter the extract.

Finally, after the filtration phase which eliminates the particles larger than about 1 mm in size, solids, such as polysaccharides or proteins, are still present in suspension and have to be eliminated to enable a coffee powder which dissolves perfectly without any solids appearing in the cup to be obtained after concentration and freeze-drying or spray-drying of the extract.

The suspended solids are normally eliminated by centrifugation, the sediment obtained then being decanted, the supernatant decantation liquid being reintroduced into the final filtered extract while the solid residue obtained is eliminated.

The main disadvantage of this process is that it produces a sediment which has to be retreated by decantation and which is not easy to handle.

In addition, the suspended solids cannot always be satisfactorily eliminated by centrifugation.

Accordingly, the problem addressed by the present invention was to provide a process for the production of instant soluble coffee powder in which extraction of the coffee in the liquid phase would enable the content of insoluble solids in the final extract to be reduced.

SUMMARY OF THE INVENTION

Accordingly, the present invention relates in particular to a process for the production of soluble instant coffee powder in which an extraction liquid is percolated countercurrent fashion through cells filled with ground roasted coffee material and operating in series, the final liquid extract then being converted into powder form, characterized in that, after the hot cells containing the most intensively extracted coffee, the rate of percolation of the liquid extract through at least one of the extraction cells positioned between the cells containing the least and the most extracted coffee material is reduced.

By virtue of this reduction in the rate of percolation through the extraction cells, the cells act as filters which, by retaining the suspended solids, enable a final extract having a greatly reduced insoluble fraction in relation to the prior art to be obtained.

The present invention also relates to a process of the type described above in which, after reduction of the percolation rate, the percolation flow is regulated by increasing the flow rate of the extraction liquid to achieve the desired extraction downstream of the cells where the reduction is effected.

The present invention also relates to an apparatus for carrying out the process described above in which, after the hot cells containing the most intensively extracted coffee, means are provided to reduce the percolation rate in at least one cell downstream of the said hot cells.

The present invention also relates to an apparatus of the type described above in which, after at least one cell where the percolation rate has been reduced, means are provided to regulate the percolation flow in the cells containing the freshest roasted coffee as a function of the desired extraction level.

Other features and advantages of the invention will become apparent from the following description in conjunction with the accompanying drawing which is provided purely by way of example and which diagrammatically illustrates an apparatus for carrying out the process according to the invention.

BRIEF DESCRIPTION OF THE DRAWING

The drawing figure illustrates a countercurrent extraction apparatus system which incorporates devices which enable practice of the process of the present invention.

DETAILED DESCRIPTION OF THE DRAWING AND THE INVENTION

As can be seen from the drawing, an apparatus for the extraction of coffee may be made up of several extraction cells operating in series, each of which is formed by a column of which the lower part is connected to the upper part of the preceding column and of which the upper part is connected to the lower part of the following column.

Generally, an extraction apparatus is made up of four to eight extraction cells and, preferably, six extraction cells.

Cell 1 contains the most intensively extracted coffee while cell 6 contains the least intensively extracted coffee, the level of extraction decreasing from cell 1 to cell 6.

The extraction liquid, which may consist of water under pressure at a temperature of 150° C. to 180° C., is introduced at the bottom of cell 1, passes upwards through that cell, taking up soluble product in the process, leaves at the upper end of cell 1 and passes successively through each of the cells up to and including cell 6 which is the last cell and which contains fresh ground roasted coffee.

Accordingly, the final extract issues from cell 6 and is subsequently filtered and, optionally, centrifuged and then evaporated and finally converted into powder form by freeze-drying or spray-drying.

The crucial parameter to be taken into account for understanding the invention lies in the rate of percolation of the liquid extract through an extraction cell.

This percolation rate should be understood as the ratio between the flow of liquid extract, expressed for example in liters per minute, and the cross-section of the extraction cell, the value obtained being dimensionally comparable with a velocity.

Accordingly, it will be understood that, for the same flow, a percolation rate can vary considerably from one extraction cell to another if the cross-sections of those cells are different. On the other hand, if the cross-sections of all the extraction cells are identical, the percolation rate as defined above is unambiguously related to the flow.

Now, in an installation for the liquid-phase extraction of coffee by percolation through extraction cells, all the cells being intended successively to occupy all the places of an extraction cycle, they all have the same geometry and, hence, particularly the same cross-section.

Thus, any reduction or increase in flow will reciprocally produce a reduction or increase in the percolation rate.

In the following description of the present invention, the percolation rates are expressed in centimeters per minute and the flows in liters per minute. Conventionally, the rate of percolation of the liquid extract through the extraction cells is between 12 cm/min. and 15 cm/min.

In the process according to the invention, the percolation rate is reduced after the hot cells, the liquid extract issuing at a temperature above 140° C. By virtue of this reduction in the percolation rate after the hot cells, there is a distinct reduction in the insoluble fraction in the final extract. Nevertheless, it appears that, if the percolation rate is excessively reduced after the hot cells, the flow of the liquid extract falls to an inadequate level in the extraction cells, adversely affecting the degree of extraction which can thus become inadequate in an industrial process where all the cells are identical.

To overcome this drawback, it can be of advantage to regulate the flow of the liquid extract as a function of the desired degree of extraction measured in the final extract after the rate of percolation in one or more extraction cells has been reduced downstream of the hot cells.

If all the cells have the same cross-section, there will be an increase in the percolation rate in the cells downstream of those cells where the percolation rate has been reduced. However, this increase in the percolation rate should not be compared in any way with the previous reduction in the percolation rate.

This is because, although it is advisable to reduce the percolation rate after the hot cells to obtain a reduction in the insoluble fraction in the final extract, the reduction in flow being only one of a number of ways of achieving this result, the extraction level in the extraction cells is dependent inter alia on the ratio between the volume of percolating liquid and the mass of roasted coffee, irrespective of how the coffee is arranged, i.e. in a thin bed of wide-cross-section or in a thick column of narrow cross-section.

Thus, since an extraction cycle has a predetermined duration, the volume of percolating liquid is determined by the flow rate and not by the percolation rate.

The following EXAMPLES illustrate the process according to the invention and demonstrate the importance of the parameters selected.

In a conventional installation for the liquid-phase extraction of coffee, the percolation rate in the extraction cells is of the order of 15 cm/minute, the insoluble fraction in the final extract being capable of reaching 3.3% and more.

The following Table, which relates to an installation comprising two hot cells, two intermediate cells where the percolation rate is reduced and two cold cells where the flow rate is regulated, regulation being effected in fact by an increase in the percolation rate, all the cells having the same-cross-section, demonstrates the development of the insoluble fraction in the final extract as a function of the percolation rate in the intermediate cells.

| Percolation rate in the intermediate cells cm/min. | Insoluble fraction in the final extract % |
| --- | --- |
| 15.0 | 3.3 |
| 13.6 | 2.9 |
| 12.9 | 2.8 |
| 10.3 | 1.4 |
| 9.6 | 0.8 |
| 9.1 | 0.4 |

It can thus be seen that, for a percolation rate of 10 cm/min., the insoluble fraction is of the order of 1.2%, which is advantageous, as will be seen hereinafter.

In addition, the following Table illustrates the effect of the number of intermediate cells on the insoluble fraction in the final extract, the installation comprising two hot cells upstream and two cold cells downstream where the percolation rate is increased.

| Number of intermediate cells | Insoluble fraction in the final extract % |
| --- | --- |
| 4 | 0.8 |
| 3 | 0.7 |
| 2 | 1.2 |
| 1 | 2.1 |

Finally, the following Table demonstrates the effect of the flow rate in the cold cells on the extraction level measured in the final extract.

| | Test 1 | Test 2 |
| --- | --- | --- |
| Temperature in the hot cells | 180° C. | 180° C. |
| Flow rate in the hot cells | 24.8 l/min. | 24.7 l/min. |
| Flow rate in the cold cells | 33.0 l/min. | 31.5 l/min. |
| Temperature in the cold cells | 105° C. | 105° C. |
| Extraction level measured in the final extract | 42.7% | 40.4% |

It can thus clearly be seen that, all things otherwise being equal, the extraction level is a function of the flow rate in the cold cells.

Without wishing to be limited to any one explanation of the phenomenon observed, it appears that the reduction in the insoluble fraction in the final extract is attributable to the fact that, as the percolation rate decreases at least in the intermediate cells, the intermediate cells act as filters which retain the suspended solids entrained from the hot cells.

The solids retained in these intermediate cells would then either be hydrolyzed when the intermediate cells have become the hot cells or simply removed when the grounds contained in the most intensively extracted hot cell are eliminated.

This filtration effect can be demonstrated by calculating the extraction level achieved in each cell.

Thus, for the intermediate cells, it has been found that the extraction level can be negative which clearly shows that solids present in the extract before passage through the intermediate cells are no longer present at the exit of those cells and have therefore been retained in the bed of coffee.

The following Table illustrates this phenomenon for an installation comprising six cells, including two intermediate cells.

| Number of cells | Extraction level achieved in the cell (%) |
| --- | --- |
| 6 | 11.83 |
| 5 | 5.83 |
| 4 | −8.45 |
| 3 | −2.06 |
| 2 | 12.39 |
| 1 | 18.57 |

To carry out the process according to the invention in the preferred embodiment illustrated in the accompanying drawing, means 7 are provided after two hot cells 1, 2 to reduce the percolation rate in at least one cell 3 after the last hot cell 2.

The means 7 may consist of an evaporator 7 which, by reducing the volume of the liquid extract issuing from the cell 2 and intended to percolate through the cell 3, will produce a reduction in the flow rate and hence in the percolation rate in the cell 3.

To prevent the extraction level achieved in the cells containing the freshest coffee from being overly penalized by this reduction in the percolation rate and hence in the flow rate, a device 8 for increasing the flow rate in the following cells is arranged between two successive extraction cells, for example between the cells 4 and 5, downstream of the cell 3.

The device 8 may be formed by an additional inlet for extraction liquid, for example hot water, which, added to the liquid extract coming from the cell 4, thus increases the volume of liquid percolating through the cells 5 and 6. The use of a hot water inlet also enables the temperature to be regulated.

By virtue of the process and apparatus according to the invention, it is thus possible readily to obtain a final extract at the exit of the cell 6—containing the freshest roasted coffee—which has an insoluble fraction of less than 1.2%.

Now, various tests have shown that, for a final extract having an insoluble fraction of less than 1.2%, a single filtration step with no subsequent centrifugation is sufficient to obtain a juice from which an instant coffee powder dissolving in hot water without the appearance of any suspended solids can be obtained after evaporation followed by spray-drying or freeze-drying.

I claim:

1. In a countercurrent coffee extraction process, wherein coffee material to be extracted is contained in extraction cells connected in series and wherein a cell containing the least extracted coffee material to be extracted is positioned downstream, with respect to a flow of extraction liquid, from a cell containing coffee material which is most extracted, the improvement comprising reducing a percolation rate of extraction liquid passing through at least one extraction cell intermediately positioned in the extraction cell series between the extraction cells containing the least extracted coffee material and the most extracted coffee material and then increasing the flow rate of extraction liquid through a cell positioned downstream from the at least one cell in which the percolation rate is reduced.

2. The process according to claim 1 wherein the percolation rate of the extraction liquid passes through at least two intermediately positioned cells in series at a reduced rate.

3. A process according to claim 1 wherein the extraction cells in series form a group of cold cells and a group of hot cells, which contain lesser and more extracted coffee, respectively, and wherein the percolation rate of extraction liquid obtained from the group of hot cells and passed to cells intermediately positioned with respect to the hot and cold cells is reduced and wherein the flow rate of extraction liquid passing through the cold cells is increased.

4. A process according to claim 3 wherein the extraction liquid passes through at least two adjacent intermediately positioned cells in series between the hot cells and cold cells at a reduced rate.

5. A process according to claim 1 wherein the cells in the series have differing dimensions to effect varying the percolation rate and flow rate.

6. A process according to claim 1 wherein the percolation rate is reduced by evaporating an extract obtained from a cell in the series to reduce the volume of the extract and thereby obtain a reduced volume extract and then introducing the reduced volume extract into the cell next in series from the cell from which the extract was obtained to thereby reduce the percolation rate in at least one cell.

7. A process according to claim 1 wherein the flow rate is increased by introducing further extraction liquid into a cell in the series in which the flow rate is increased to increase the flow rate.

8. A process according to claim 6 wherein the flow rate is increased by introducing further extraction liquid into a cell in the series in which the flow rate is increased to increase the flow rate.

* * * * *

UNITED STATES PATENT AND TRADEMARK OFFICE
CERTIFICATE OF CORRECTION

PATENT NO. : 5,190,779
DATED : March 2, 1993
INVENTOR(S) : Klaus SCHLECHT

It is certified that error appears in the above-identified patent and that said Letters Patent is hereby corrected as shown below:

Column 1, line 12, after "coffee" insert a period.

Column 1, line 19, after "then" insert --the--.

Column 4, between lines 5 and 6, insert --EXAMPLES--.

Column 4, line 6, "EXAMPLES" should be --Examples--.

Signed and Sealed this

Twenty-third Day of November, 1993

Attest:

BRUCE LEHMAN

Attesting Officer      Commissioner of Patents and Trademarks